Patented Feb. 28, 1950

2,498,918

UNITED STATES PATENT OFFICE 2,498,918

MANUFACTURE OF 5-HYDROXYMETHYL 2-FURFURAL

Walter Norman Haworth and Leslie Frederick Wiggins, Birmingham, England

No Drawing. Application October 8, 1946, Serial No. 702,068. In Great Britain October 17, 1945

2 Claims. (Cl. 260—345)

This invention relates to the manufacture of 5-hydroxymethyl 2-furfural from sucrose.

The invention comprises a process in which an aqueous solution of the sucrose is heated under pressure, the 5-hydroxymethyl 2-furfural being subsequently obtained from the reaction mixture by solvent extraction.

The heating under pressure is effected in an atmosphere of hydrogen in an autoclave fitted with an agitator and from the resulting solution the 5-hydroxymethyl 2-furfural is isolated after the appropriate removal of humin material and other impurities by suitable solvent extraction, for example with ethyl acetate. The 5-hydroxymethyl 2-furfural may be purified further by distillation in a vacuum if desired.

Example

Sucrose (300 parts) and water (800 parts) were heated together with agitation in an atmosphere of hydrogen in an autoclave for two hours at 162°–167° C. under pressure. After being cooled the humin material (38 parts) was filtered off and the filtrate treated with calcium carbonate (50 parts) and basic lead acetate (2 to 5 parts) for two to three hours. After filtering (or centrifuging) the solution was extracted by a solvent (of which ethyl acetate is a convenient example) in a continuous extraction apparatus. The extract was dried over anhydrous magnesium sulphate, the solvent evaporated, and the 5-hydroxymethyl 2-furfural obtained was a brown liquid (48.5 parts) which solidified when cooled to 0° C.

Having thus described our invention what we claim as new and desire to secure by Letters Patent is:

1. A process for the manufacture of 5-hydroxymethyl 2-furfural from sucrose, in which a solution of sucrose and water alone is heated under pressure in an atmosphere of hydrogen, and in which after cooling and removal of extraneous matter, the 5-hydroxymethyl 2-furfural is obtained from the reaction mixture by solvent extraction.

2. A process for the manufacture of 5-hydroxymethyl 2-furfural from sucrose, comprising heating and agitating a solution of sucrose and water alone under pressure in an atmosphere of hydrogen, cooling the solution and removing extraneous matter therefrom, treating the cooled solution with calcium carbonate and basic lead acetate, and obtaining the 5-hydroxymethyl 2-furfural from the reaction mixture by solvent extraction.

WALTER NORMAN HAWORTH.
LESLIE FREDERICK WIGGINS.

REFERENCES CITED

The following references are of record in the file of this patent:

Haworth et al., Chemical Society Journal, pages 667–669, 1944.

Lowy and Harrow, An Introduction to Organic Chemistry, page 191, 6th edition; John Wiley and Sons, Inc., N. Y.